(12) United States Patent
Axelrod et al.

(10) Patent No.: US 11,910,778 B2
(45) Date of Patent: Feb. 27, 2024

(54) ABSORBENT PAD

(71) Applicant: FOUR PAWS PRODUCTS, LTD., Neptune City, NJ (US)

(72) Inventors: Glen S. Axelrod, Colts Neck, NJ (US); Ajay Gajria, Maharashtra (IN)

(73) Assignee: FOUR PAWS PRODUCTS, LTD., Neptune City, NJ (US)

( * ) Notice: Subject to any disclaimer, the term of this patent is extended or adjusted under 35 U.S.C. 154(b) by 536 days.

(21) Appl. No.: 16/293,850

(22) Filed: Mar. 6, 2019

(65) Prior Publication Data

US 2020/0281155 A1 Sep. 10, 2020

(51) Int. Cl.
| | | |
|---|---|---|
| *A01K 1/015* | (2006.01) | |
| *B32B 27/10* | (2006.01) | |
| *B32B 27/32* | (2006.01) | |

(52) U.S. Cl.
CPC ............ *A01K 1/0157* (2013.01); *B32B 27/10* (2013.01); *B32B 27/32* (2013.01); *B32B 2307/726* (2013.01); *B32B 2307/7265* (2013.01); *B32B 2555/02* (2013.01)

(58) Field of Classification Search
CPC .. A01K 1/0157; A01K 1/0155; A01K 1/0107; A01K 10/0353; B32B 27/10; B32B 27/32; B32B 2307/726; B32B 2307/7265; B32B 2555/02; A61F 13/475; A61F 13/4751; A61F 13/4757; A61F 13/4758; A61F 13/476; A61F 2013/530481
See application file for complete search history.

(56) References Cited

U.S. PATENT DOCUMENTS

| | | |
|---|---|---|
| 5,797,347 A | 8/1998 | Ochi |
| 6,227,145 B1 | 5/2001 | Miyamoto et al. |
| 6,244,216 B1 | 6/2001 | Ochi |
| 2005/0166855 A1 | 8/2005 | Kaneko et al. |
| 2006/0260559 A1 | 11/2006 | Fry et al. |
| 2011/0139082 A1 | 6/2011 | Blagden |
| 2012/0132147 A1 | 5/2012 | Cheng |
| 2016/0143248 A1* | 5/2016 | Bin ..................... A01K 1/0155 119/172 |

FOREIGN PATENT DOCUMENTS

CN 1644037 7/2005

OTHER PUBLICATIONS

International Search Report and Written Opinion from related PCT Appln. No. PCT/US2020/021310, dated Jun. 3, 2020.
Aquakeep brochure, Sumitomo Seika Chemicals Co., Ltd., Japan, May 31, 2012.

(Continued)

*Primary Examiner* — Catherine A. Simone
(74) *Attorney, Agent, or Firm* — Grossman, Tucker, Perreault & Pfleger, PLLC

(57) ABSTRACT

An absorbent pad may include a liquid permeable layer, a liquid impermeable layer, and a liquid absorbent layer disposed between the liquid permeable layer and the liquid impermeable layer. The liquid absorbent layer may include a first absorption region and a second absorption region. The second absorption region may extend around the first absorption region and may be configured to absorb more liquid per unit area than the first absorption region.

28 Claims, 7 Drawing Sheets

(56) References Cited

OTHER PUBLICATIONS

First Office Action from related Chinese Appln. No. 202080018483.1, dated Mar. 11, 2022. English translation attached.
Extended European Search Report from related EPO Appln. No. 20767440.9, dated Nov. 3, 2022.
Office Action from related Chinese Appln. No. 202080018483.1, dated Feb. 7, 2023.

* cited by examiner

ABSORBENT PAD

TECHNICAL FIELD

The present disclosure is generally related to absorbent pads and more specifically related to an absorbent pad for collecting pet urine.

BACKGROUND INFORMATION

Pet owners may find it desirable to housetrain a new pet (e.g., a dog). The housetraining process may involve the pet owner teaching the pet to use a consistent location within the home to urinate. An absorbent pad may be placed at the location where the pet is taught to urinate such that urine is absorbed by the pad. As such, the urine may be more easily disposed of without harm to surfaces (e.g., a floor) within the home.

SUMMARY

An example absorbent pad may include a liquid permeable layer, a liquid impermeable layer, and a liquid absorbent layer disposed between the liquid permeable layer and the liquid impermeable layer. The liquid absorbent layer may include a first absorption region and a second absorption region. The second absorption region may extend around the first absorption region and may be configured to absorb more liquid per unit area than the first absorption region.

Another example absorbent pad may include a liquid permeable layer, a liquid impermeable layer, an attractant layer configured to attract an animal, and a liquid absorbent layer disposed between the liquid permeable layer and the liquid impermeable layer. The liquid absorbent layer may define a first absorption region and a second absorption region. The second absorption region may extend around the first absorption region and the second absorption region may be configured to absorb more liquid per unit area than the first absorption region. The liquid absorbent layer may include a pulp sublayer, a tissue sublayer, and a superabsorbent pulp sublayer. The pulp sublayer may be disposed between the tissue sublayer and the superabsorbent polymer sublayer. A portion of the superabsorbent polymer sublayer corresponding to the first absorption region may include a first quantity of superabsorbent polymer and a portion of the superabsorbent polymer sublayer corresponding to the second absorption region may include a second quantity of superabsorbent polymer. The second quantity of superabsorbent polymer may measure greater than the first quantity of superabsorbent polymer.

An example method of using an absorbent pad may include placing the absorbent pad on a floor. The absorbent pad may include a liquid permeable layer, a liquid impermeable layer, and a liquid absorbent layer disposed between the liquid permeable layer and the liquid impermeable layer. The liquid absorbent layer may include a first absorption region and a second absorption region. The second absorption region may extend around the first absorption region and may be configured to absorb more liquid per unit area than the first absorption region. When the liquid is at least partially absorbed by the second absorption region, the second absorption region defines a raised region such that the first absorption region is recessed relative to the second absorption region.

BRIEF DESCRIPTION OF THE DRAWINGS

These and other features and advantages will be better understood by reading the following detailed description, taken together with the drawings, wherein.

DETAILED DESCRIPTION OF PREFERRED EMBODIMENTS

The present disclosure is generally related to an absorbent pad for use with household pets. The absorbent pad preferably includes at least three layers. A first layer is configured to engage a surface, such as a floor. The first layer is liquid resistant such that liquid does not permeate through the first layer. A second layer is disposed on the first layer and is configured to be liquid absorbent. A third layer is disposed on the second layer such that the second layer is disposed between the first and third layers. The third layer is configured to be liquid permeable such that at least a portion of liquid incident thereon passes through the third layer. As such, liquid that passes through the third layer is at least partially absorbed by the second layer and any liquid that is not absorbed by the second layer is prevented from passing through the first layer and onto a surface that the first layer engages (e.g., a floor).

In some instances, the absorbent pad can define a first absorption region and a second absorption region. The second absorption region extends around the first absorption region. The absorption properties of the first absorption region may be configured to be different from those of the second absorption region. For example, the second absorption region may be configured to absorb a greater quantity of liquid per unit area than the first absorption region. Such a configuration may reduce or otherwise mitigate an amount of liquid that escapes the absorbent pad.

Figure 1:
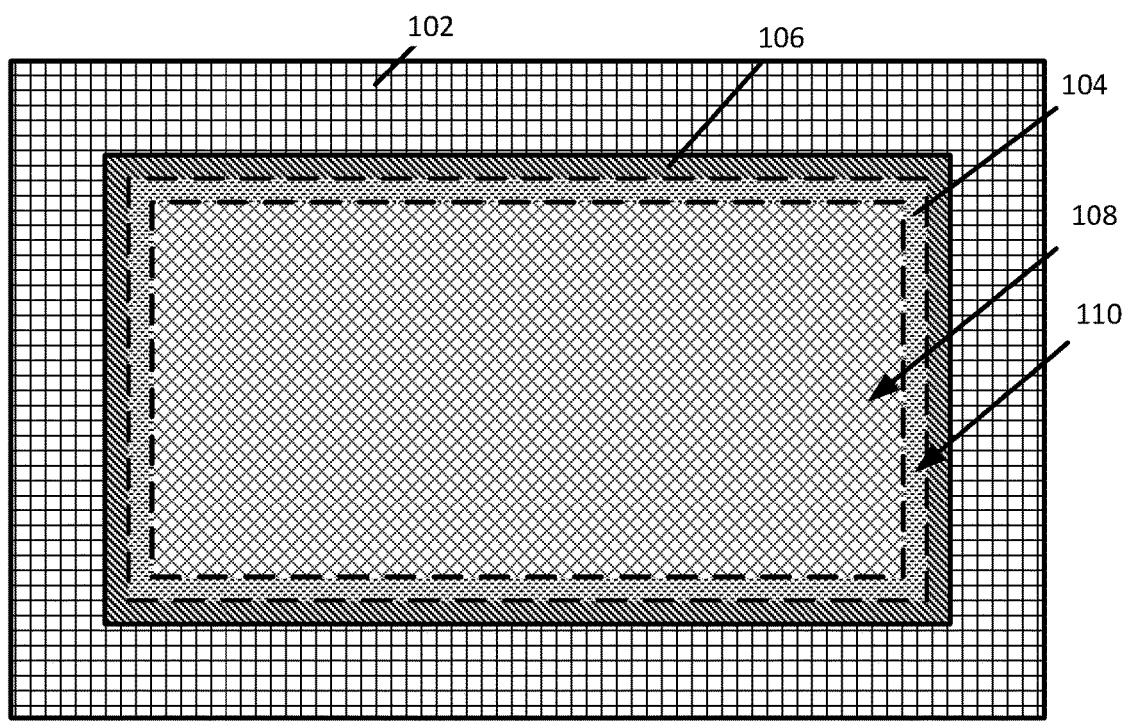
FIG. 1 is a schematic view of an example of an absorbent pad, consistent with embodiments of the present disclosure.

FIG. 1 shows a schematic example of a preferred absorbent pad 100 having a first layer 102, a second layer 104, and a third layer 106, the second layer 104 being disposed between the first layer 102 and the third layer 106. The absorbent pad 100 is configured to be disposed on a surface (e.g., a floor) such that the first layer 102 engages the surface. The first layer 102 is configured to be impermeable to liquids such that liquid incident thereon does not pass therethrough. As such, when an animal (e.g., a dog) positions itself on the absorbent pad 100 to urinate, urine will not pass through the absorbent pad 100 and on to, for example, a floor on which the absorbent pad 100 is disposed.

The second layer 104 is configured to be absorbent such that at least a portion of a liquid incident thereon is absorbed by the second layer 104. In some instances, the second layer 104 can have two or more absorption regions. For example, the second layer 104 can include a first absorption region 108 and a second absorption region 110. As shown, the second absorption region 110 can extend around the first absorption region 108. The second absorption region 110 can be configured to absorb more liquid per unit area than the first absorption region 108. As such, excess liquid may be prevented from running off the absorbent pad 100 (e.g., if a pet urinates at an off-center location) by being absorbed within the second absorption region 110.

The third layer 106 extends over at least a portion of the second layer 104 and is configured to be liquid permeable such that at least a portion of the liquid incident thereon passes therethrough. Therefore, the second layer 104 can generally be described as being disposed between the first and third layers 102 and 106. As such, when a pet urinates on the third layer 106, a substantial portion of the urine passes through the third layer 106 such that at least a portion of the urine can be absorbed by the second layer 104. In some instances, the third layer 106 can couple the second layer 104 to the first layer 102.

The absorbent pad 100 can have any shape. For example, the absorbent pad 100 can be square-shaped, rectangle-shaped, circular-shaped, pentagonal-shaped, octagonal-shaped, and/or any other shape.

Figure 2:
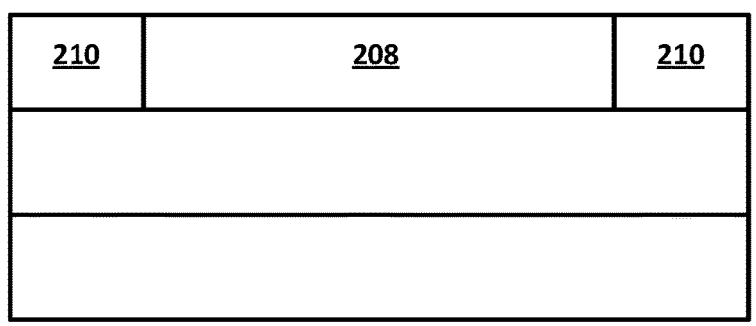
FIG. 2 is a schematic cross-sectional view of an example of an absorbent layer capable of being used with the absorbent pad of FIG. 1, consistent with embodiments of the present disclosure.

FIG. 2 shows a schematic cross-sectional view of an absorbent layer 200, which may be an example of the second layer 104 of FIG. 1. As shown, the absorbent layer 200 includes a first sublayer 202, a second sublayer 204, and a third sublayer 206, the second sublayer 204 being disposed between the first and third sublayers 202 and 206. The third sublayer 206 can be configured to engage, for example, the first layer 102 of FIG. 1 and the first sublayer 202 can be configured to engage, for example, the third layer 106 of FIG. 1.

The first sublayer 202 can be configured to be more absorbent than the second sublayer 204 and the second sublayer 204 can be configured to be more absorbent than the third sublayer 206. As such, in some instances, the sublayers 202, 204, and 206 can generally be described as increasing in absorbency in a direction away from the first layer 102. Therefore, in some instances, a majority of a liquid incident on the absorbent layer 200 can be absorbed by the first sublayer 202.

As shown, the first sublayer 202 can include a first absorption region 208 and a second absorption region 210. The second absorption region 210 can be configured to absorb more liquid per unit area than the first absorption region 208. In some instances, the second absorption region 210 can extend around the first absorption region 208, enclosing the first absorption region 208.

The first sublayer 202 can include a superabsorbent polymer. The superabsorbent polymer can be unevenly distributed across the first sublayer 202. For example, the second absorption region 210 can include more superabsorbent polymer by mass than the first absorption region 208. As such, the second absorption region 210 can absorb more liquid per unit area than the first absorption region 208. The second sublayer 204 can include a pulp (e.g., a paper pulp) and the third sublayer 206 can include tissue paper. The second and third sublayers 204 and 206 can also have first and second absorption regions that generally correspond to the first and second absorption regions 208 and 210 of the first sublayer 202.

Figure 3:
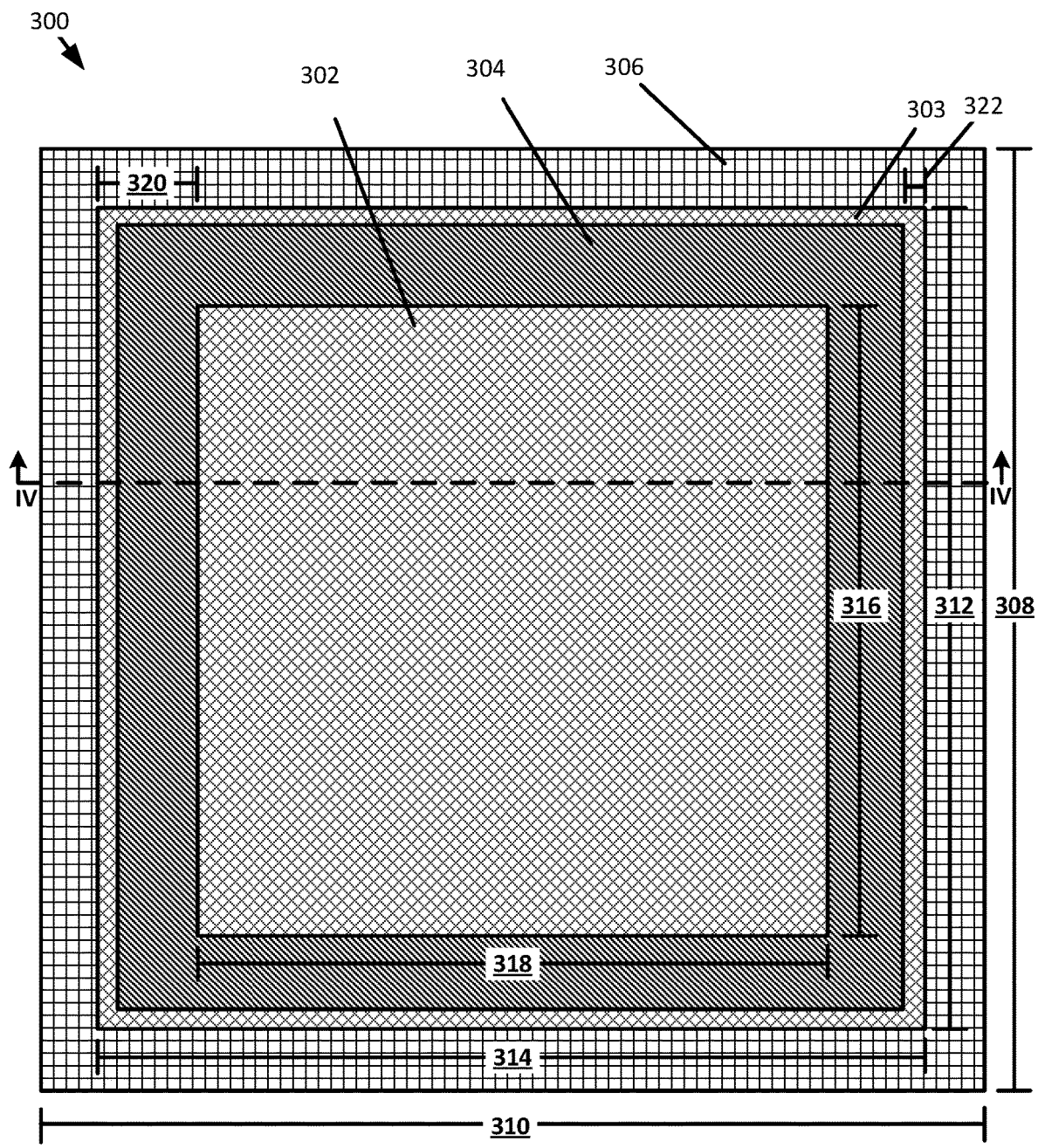
FIG. 3 is a schematic view of an example of an absorbent pad, consistent with embodiments of the present disclosure.

FIG. 3 shows a schematic example of an absorbent pad 300, which may be an example of the absorbent pad 100 of FIG. 1. As shown, the absorbent pad 300 includes a recessed region 302, a raised region 304, and a peripheral region 306. In some instances, a step region 303 can extend around the raised region 304 such that the step region 303 is disposed between the peripheral region 306 and the raised region 304. The step region 303 can have a configuration (e.g., layers or sublayers) similar to that of, for example, the recessed region 302, the raised region 304, and/or the peripheral region 306. For example, the step region 303 may be at least partially defined by at least a portion of one or more of the recessed region 302, the raised region 304, and/or the peripheral region 306.

The recessed region 302 and the step region 303 are configured to be recessed relative to the raised region 304 in response to a liquid being at least partially absorbed by the absorbent pad 300 (e.g., the recessed region 302, the raised region 304, and/or the step region 303). In other words, the raised region 304 is configured to expand (e.g., raise) in response to liquid being absorbed therein. As such, when a liquid is absorbed by the recessed region 302, the step region 303, and the raised region 304, the recessed region 302 and the step region 303 can be configured to be recessed relative to the raised region 304. When in a dry state, the raised region 304, the recessed region 302, and the step region 303 may be substantially co-planar when the absorbent pad 300 is disposed on a surface for use by an animal (e.g., the raised region 304, the recessed region 302, and the step region 303 may not be readily identifiable by a user of the absorbent pad 300 prior to at least partially absorbing a liquid). In some instances, at least a portion of the absorbent pad 300 can be embossed to show one or more designs. The embossed designs may be configured to encourage a flow direction of a liquid and/or to visually identify a location of, for example, the recessed region 302 and/or the raised region 304. In some instances, the recessed region 302 and the step region 303 are also configured to expand in response to a liquid being absorbed therein (e.g., at an expansion rate that is slower than that of the raised region 304).

The raised region 304 extends around the recessed region 302 and the peripheral region 306 extends around the raised region 304. In some instances, the raised region 304 may enclose (e.g., extend continuously around) the recessed region 302. The raised region 304 and the recessed region 302 can be configured such that excess liquid (e.g., unabsorbed liquid) collects within the recessed region 302 (e.g., after the raised region 304 has started expanding).

A peripheral region length 308 (e.g., which may extend between opposing sides of the peripheral region 306) may measure, for example, in a range of 300 millimeters (mm) to 1300 mm and a peripheral region width 310 (e.g., which may extend between opposing sides of the peripheral region 306) may measure, for example, in a range of 300 mm to 1300 mm. By way of further example, the peripheral region length 308 may measure in a range of 500 mm to 900 mm and the peripheral region width 310 may measure in a range of 500 mm to 900 mm. By way of still further example, the peripheral region length 308 may measure 580 mm and the peripheral region width 310 may measure 560 mm.

A raised region length 312 (e.g., which may extend between opposing sides of the raised region 304 or opposing sides of the step region 303) may measure, for example, in a range of 200 mm to 1100 mm and a raised region width 314 (e.g., which may extend between opposing sides of the raised region 304 or opposing sides of the step region 303) may measure, for example, in a range of 200 mm to 1100 mm. By way of further example, the raised region length 312 may measure in a range of 400 mm to 700 mm and the raised region width 314 may measure in a range of 400 mm to 700 mm. By way of still further example, the raised region length 312 may measure 520 mm and the raised region width 314 may measure 510 mm.

A recessed region length 316 (e.g., which may extend between opposing sides of the recessed region 302) may measure, for example, in a range of 200 mm to 600 mm and a recessed region width 318 (e.g., which may extend between opposing sides of the recessed region 302) may measure, for example, in a range of 200 mm to 600 mm. By way of further example, the recessed region length 316 may measure in a range of 300 mm to 500 mm and the recessed region width 318 may measure in a range of 300 mm to 500 mm. By way of still further example, the recessed region length 316 may measure in a range of 425 mm to 475 mm and the recessed region width 318 may measure in a range of 425 mm to 475 mm. By way of still further example, the recessed region length 316 may measure 450 mm and the recessed region width 318 may measure 440 mm.

A raised region thickness 320 (e.g., which may extend between an outer side and an inner side of the raised region 304 or an outer side of the step region 303 and an inner side of the raised region 304) may measure, for example, in a range of 5 mm to 100 mm. By way of further example, the raised region thickness 320 may measure in a range of 25 mm to 80 mm. By way of still further example, the raised region thickness 320 may measure 35 mm. A step region thickness 322 (e.g., which may extend between an outer side and an inner side of the step region 303) may measure, for example, in a range of 2.5 mm to 7.5 mm. By way of further example, the step region thickness 322 may measure 5 mm.

Figure 4:
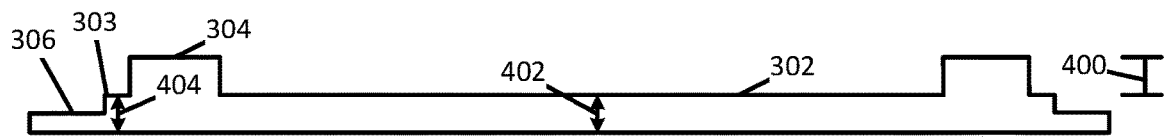
FIG. 4 is a schematic cross-sectional view of the absorbent pad of FIG. 3 after a liquid has been absorbed therein taken along the line IV-IV, consistent with embodiments of the present disclosure.

FIG. 4 is a schematic cross-sectional view of the absorbent pad 300 after a liquid has been absorbed by the absorbent pad 300 taken along the line IV-IV of FIG. 3. A raised region height 400, as measured from an upper surface of the peripheral region 306 (or, instances including the step region 303, from an upper surface of the step region 303) to an upper surface of the raised region 304 may measure in a range of 0.5 mm to 25 mm, when a liquid is absorbed therein. By way of further example, the raised region height 400 may measure in a range of 1 mm to 13 mm, when a liquid is absorbed therein. By way of still further example, the raised region height 400 may measure in a range of 2 mm to 5 mm, when a liquid is absorbed therein. Prior to absorbing a liquid, the raised region height 400 may measure, for example, in a range of 0.25 mm to 1 mm.

The recessed region 302 may have a recessed region height 402 that measures, for example, in a range of 0.25 mm to 10 mm, when a liquid is absorbed therein. By way of further example, the recessed region height 402 may measure in a range of 0.5 mm to 7 mm, when a liquid is absorbed therein. By way of still further example, the recessed region height 402 may measure in a range of 0.5 mm to 6 mm, when a liquid is absorbed therein. In some instances, the recessed region height 402 may measure substantially the same prior to and after absorption of a liquid. Prior to absorbing a liquid, the recessed region height 402 may measure, for example, in a range of 0.25 mm to 1 mm.

Figure 5:
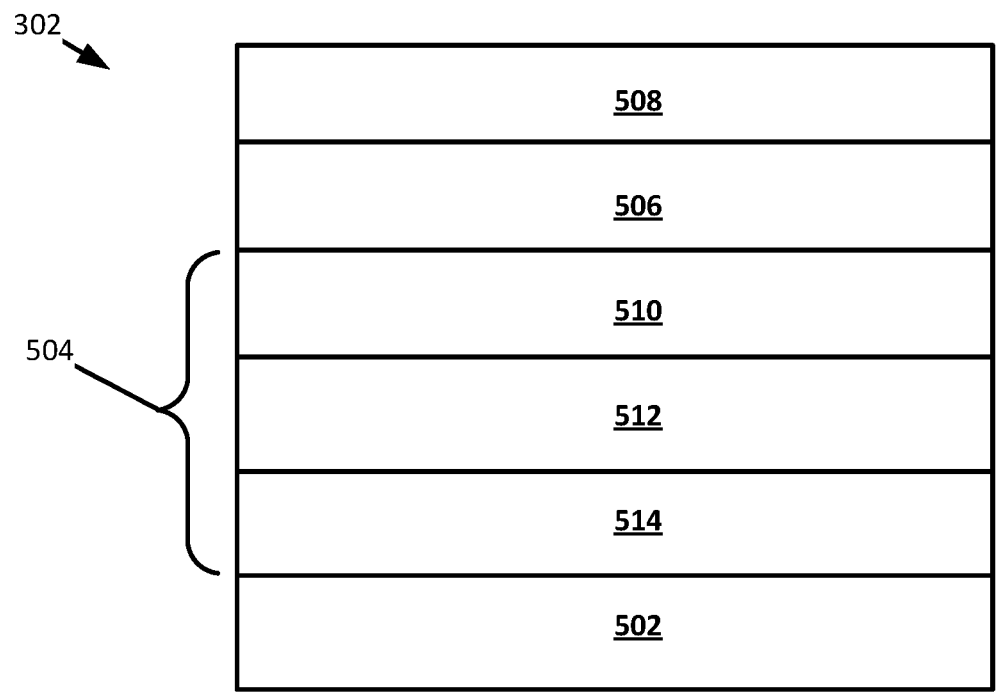
FIG. 5 is a schematic cross-sectional view of the absorbent pad of FIG. 3 taken at a recessed region, consistent with embodiments of the present disclosure.

The step region 303 may have a step region height 404 that measures, for example, in a range of 0.25 mm to 10 mm, when a liquid is absorbed therein. By way of further example, the step region height 404 may measure in a range of 0.5 mm to 7 mm, when a liquid is absorbed therein. By way of still further example, the step region height 404 may measure in a range of 0.5 mm to 6 mm, when a liquid is absorbed therein. In some instances, the step region height 404 may measure substantially the same prior to and after absorption of a liquid. Prior to absorbing a liquid, the step region height 404 may measure, for example, in a range of 0.25 mm to 1 mm FIG. 5 shows a schematic cross-sectional view of an example of the recessed region 302. As shown, the recessed region 302 can include a liquid impermeable layer 502, an absorbent layer 504, an attractant layer 506, and a liquid permeable layer 508. As shown, the absorbent layer 504 is disposed between the liquid impermeable layer 502 and the attractant layer 506. As also shown, the attractant layer 506 is disposed between the absorbent layer 504 and the liquid permeable layer 508. As such, the attractant layer 506 can be liquid permeable. The liquid impermeable layer 502 may include a polymer (e.g., a polyethylene film), a bioplastic, a recycled plastic, and/or any other suitable material.

The absorbent layer 504 can include a plurality of sublayers. As shown, the absorbent layer 504 includes a superabsorbent polymer sublayer 510, a pulp sublayer 512 (e.g., paper pulp sublayer), and a tissue sublayer 514 (e.g., a tissue paper sublayer). The pulp sublayer 512 can be disposed between the superabsorbent polymer sublayer 510 and the tissue sublayer 514. The superabsorbent polymer sublayer 510 can include a superabsorbent polymer having, for example, a retention absorbency in a range of 30 g/g to 45 g/g, an absorption capacity in a range of 55 g/g to 65 g/g (as measured in a 0.9% NaCl aqueous solution), an absorptive rate (e.g., a quantity of time to absorb 50, 100, or 150 milliliters of liquid such as a 0.9% NaCl aqueous solution) in a range of 15 seconds to 40 seconds, a moisture content in a range of 4% to 9%, a measure of residual acrylic acid monomers in a range of 15 parts-per-million (ppm) to 25 ppm, and a bulk density in a range of 0.6 g/ml to 0.85 g/ml. By way of further example, the superabsorbent polymer sublayer 510 can include a superabsorbent polymer having a retention absorbency of 41 g/g, an absorption capacity of 60 g/g (as measured in a 0.9% NaCl aqueous solution), an absorptive rate of 29 seconds, a moisture content of 7.4%, a measure of residual acrylic acid monomers of 22 ppm, and a bulk density of 0.74 g/ml. By way of still further example, the superabsorbent polymer sublayer 510 can include a superabsorbent polymer having a retention absorbency of 40 g/g, an absorption capacity of 60 g/g (as measured in a 0.9% NaCl aqueous solution), an absorptive rate of 30 seconds, a moisture content of 7.2%, a measure of residual acrylic acid monomers of 18 ppm, and a bulk density of 0.74 g/ml. Particle sizes of the superabsorbent polymer forming the superabsorbent polymer sublayer 510 may measure less than 850 microns (μm). For example, between 80% and 90% of the particles may have a particle size measuring in a range of 180 μm to 500 μm.

The attractant layer 506 may include one or more attractants to encourage a pet to approach the absorbent pad 300 when there is a need to urinate. For example, the attractant may include one or more pheromones configured to encourage the pet to urinate on the absorbent pad 300.

Figure 6:
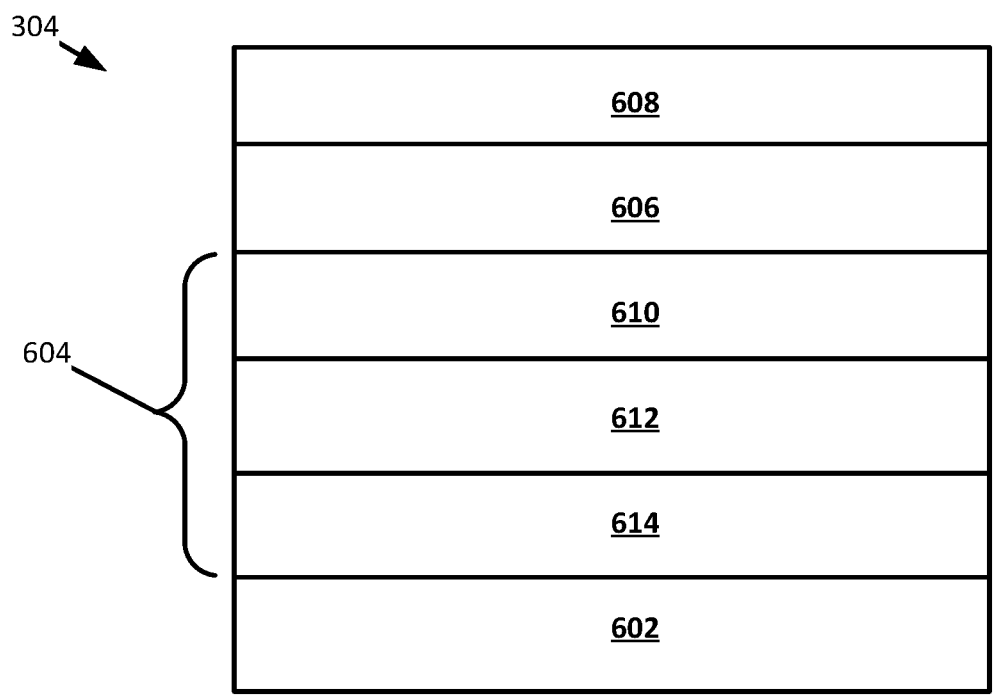
FIG. 6 is a schematic cross-sectional view of the absorbent pad of FIG. 3 taken at a raised region, consistent with embodiments of the present disclosure.

FIG. 6 shows a schematic cross-sectional view of an example of the raised region 304. As shown, the raised region 304 can include a liquid impermeable layer 602, an absorbent layer 604, an attractant layer 606, and a liquid permeable layer 608. The absorbent layer 604 can be disposed between the liquid impermeable layer 602 and the attractant layer 606. As also shown, the attractant layer 606 is disposed between the absorbent layer 604 and the liquid permeable layer 608. As such, the attractant layer 606 can be liquid permeable. The liquid impermeable layer 602 may include a polymer (e.g., a polyethylene film), a bioplastic, a recycled plastic, and/or any other suitable material.

The absorbent layer 604 can include a plurality of sublayers. As shown, the absorbent layer 604 includes a superabsorbent polymer sublayer 610, a pulp sublayer 612 (e.g., paper pulp sublayer), and a tissue sublayer 614 (e.g., a tissue paper sublayer). The pulp sublayer 612 can be disposed between the superabsorbent polymer sublayer 610 and the tissue sublayer 614. The superabsorbent polymer sublayer 610 can include a superabsorbent polymer having, for example, a retention absorbency in a range of 30 g/g to 45 g/g, an absorption capacity in a range of 55 g/g to 65 g/g (as measured in a 0.9% NaCl aqueous solution), an absorptive rate (e.g., a quantity of time to absorb 50, 100, or 150 milliliters of liquid such as a 0.9% NaCl aqueous solution) in a range of 15 seconds to 40 seconds, a moisture content in a range of 4% to 9%, a measure of residual acrylic acid monomers in a range of 15 parts-per-million (ppm) to 25 ppm, and a bulk density in a range of 0.60 g/ml to 0.85 g/ml. By way of further example, the superabsorbent polymer sublayer 610 can include a superabsorbent polymer having a retention absorbency of 41 g/g, an absorption capacity of 60 g/g (as measured in a 0.9% NaCl aqueous solution), an absorptive rate of 29 seconds, a moisture content of 7.4%, a measure of residual acrylic acid monomers of 22 ppm, and a bulk density of 0.74 g/ml. By way of still further example, the superabsorbent polymer sublayer 610 can include a superabsorbent polymer having a retention absorbency of 40 g/g, an absorption capacity of 60 g/g (as measured in a 0.9% NaCl aqueous solution), an absorptive rate of 30 seconds, a moisture content of 7.2%, a measure of residual acrylic acid monomers of 18 ppm, and a bulk density of 0.74 g/ml. Particle sizes of the superabsorbent polymer forming the superabsorbent polymer sublayer 610 may measure less than 850 microns (μm). For example, between 80% and 90% of the particles may have a particle size measuring in a range of 180 μm to 500 μm.

The superabsorbent polymer sublayer 610 of the raised region 304 can include more superabsorbent polymer, by mass, than the superabsorbent polymer sublayer 510 of the recessed region 302. The quantity of superabsorbent polymer in each superabsorbent polymer sublayer 510 and 610 may be evenly or unevenly distributed therein. For example, each side of the raised region 304 that extends around the recessed region 302 can include an equal quantity of superabsorbent polymer. In some instances, opposing sides of the raised region 304 can include equal quantities of superabsorbent polymer and adjacent sides of the raised region 304 can include different quantities of superabsorbent polymer. The superabsorbent polymer within each side of the raised region 304 may be evenly or unevenly distributed therein.

For example, the superabsorbent polymer sublayer 610 may include a quantity of superabsorbent polymer measuring in a range of 1 gram (g) to 8 g and the superabsorbent polymer sublayer 510 may include a quantity of superabsorbent polymer measuring in a range of 0.25 g to 2 g. By way of further example, the superabsorbent polymer sublayer 610 may include a quantity of superabsorbent polymer measuring 3 g and the superabsorbent polymer sublayer 510 may include a quantity of superabsorbent polymer measuring 1 g. In this example, the absorbent pad 300 may be capable of absorbing 800 milliliters (mL) to 1100 mL of liquid. By way of still further example, the superabsorbent polymer sublayer 610 corresponding to each side of the raised region 304 can include 0.75 g. In this instance, when the raised region 304 is square shaped (as shown in FIG. 3), the total superabsorbent polymer within the superabsorbent polymer sublayer 610 measures 3 g. The distribution of the superabsorbent polymer within each side of the raised region 304 may be even or uneven.

The attractant layer 606 may include one or more attractants to encourage a pet to approach the absorbent pad 300 when there is a need to urinate. For example, the attractant may include one or more pheromones configured to encourage the pet to urinate on the absorbent pad 300.

Figure 7:
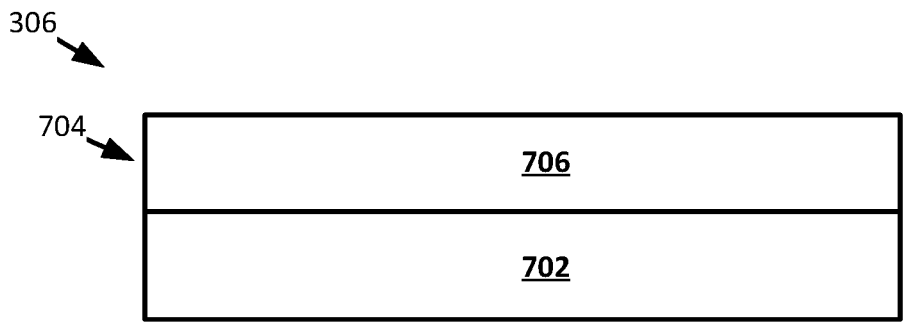
FIG. 7 is a schematic cross-sectional view of the absorbent pad of FIG. 3 taken at a peripheral region, consistent with embodiments of the present disclosure.

FIG. 7 shows a schematic cross-sectional view of an example of the peripheral region 306. As shown, the peripheral region 306 may include a liquid impermeable layer 702. In some instances, an absorbent layer 704 may extend over at least a portion of the liquid impermeable layer 702. The liquid impermeable layer 702 may include a polymer (e.g., a polyethylene film), a bioplastic, a recycled plastic, and/or any other suitable material. The absorbent layer 704 may include at least a tissue sublayer 706. Additionally, or alternatively, the absorbent layer 704 may include, for example, a superabsorbent polymer sublayer and/or a pulp sublayer.

The liquid impermeable layers 502, 602, and 702 may be formed from a substantially continuous liquid impermeable film that extends through the peripheral region 306, the raised region 304, and the recessed region 302. The liquid impermeable film may include a polymer (e.g., a polyethylene film), a bioplastic, a recycled plastic, and/or any other suitable material. The tissue sublayers 514, 614, and 706 may be formed of a substantially continuous tissue that extends through at least a portion of the peripheral region 306, the raised region 304, and the recessed region 302. The tissue may be, for example, a tissue paper.

The pulp sublayers 512 and 612 can extend substantially continuously within the raised region 304 and the recessed region 302. For example, the pulp sublayers 512 and 612 can be formed of a substantially continuous layer of pulp fibers that extends through both the raised region 304 and the recessed region 302. In some instances, the pulp sublayers 512 and 612 can include loose pulp powder that is distributed such that the pulp sublayers 512 and 612 are formed, at least partially, therefrom.

The superabsorbent polymer sublayer 510 may be a substantially continuous layer of loose superabsorbent polymer powder within the recessed region 302. The superabsorbent polymer sublayer 610 may be a substantially continuous layer of loose superabsorbent polymer powder within the raised region 304. In some instances, the loose superabsorbent polymer powder forming the superabsorbent polymer sublayer 610 may be substantially prevented from migrating (e.g., shifting) into the loose superabsorbent polymer powder forming the superabsorbent polymer sublayer 510. Similarly, when the pulp sublayers 512 and 612 are formed of a loose pulp powder, the loose pulp powder forming the pulp sublayer 512 may be substantially prevented from migrating (e.g., shifting) into the loose pulp powder forming the pulp sublayer 612.

Figure 8A:
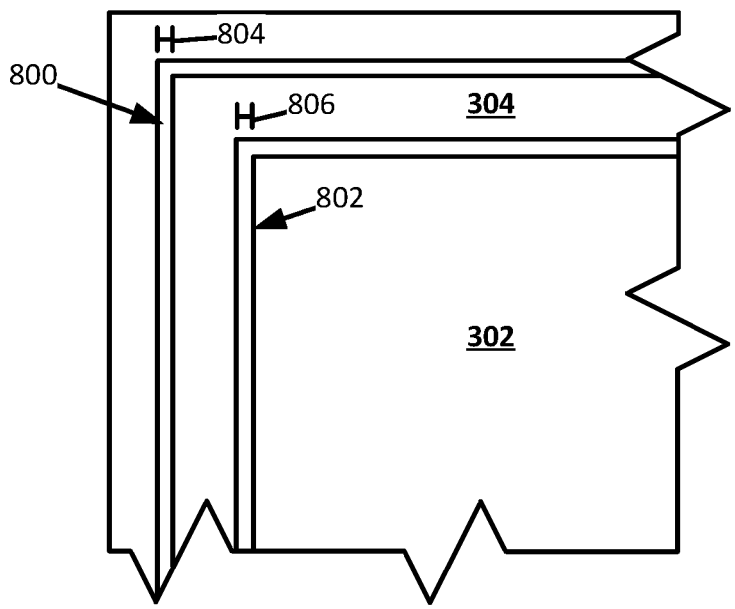
FIG. 8A is a magnified view of a portion of the absorbent pad of FIG. 3, consistent with embodiments of the present disclosure.

The liquid permeable layers 508 and 608 and the attractant layers 506 and 606 may be substantially continuous layers that extend through the raised region 304 and the recessed region 302. In some instances, the liquid permeable layers 508 and 608 and/or the attractant layers 506 and 606 can extend over the raised region 304 and the recessed region 302 and be configured to retain any loose powders (e.g., loose superabsorbent polymer powder and/or loose pulp powder) within respective ones of the recessed and raised regions 302 and 304. Sealing regions 800 and 802 (see FIG. 8A, showing a magnified view of a portion of the absorbent pad 300) may, in some instances, be formed along opposing sides of the raised region 304 such that loose powders (e.g., loose superabsorbent polymer powder and/or loose pulp powder) are substantially prevented from migrating between the recessed and raised regions 302 and 304. As shown, the sealing region 800 can generally correspond to the step region 303. A sealing region width 804 and 806 of each sealing region 800 and 802 may measure, for example, in a range of 2.5 mm to 7.5 mm. By way of further example, the sealing region widths 804 and 806 may measure 5 mm.

The sealing regions 800 and 802 can be configured to couple one or more of the liquid permeable layers 508 and/or 608 and/or one or more of the attractant layers 506 and/or 606 to one or more of the liquid impermeable layers 502, 602, and/or 702, one or more of the tissue sublayers 514, 614, and/or 706, and/or one or more of the pulp sublayers 512 and/or 612 (e.g., a portion of the pulp sublayers 512 and/or 612 not formed of a pulp powder). For example, the sealing regions 800 and 802 can be configured to be adhesively bonded and/or form a heat seal or pressure seal (e.g. utilizing rollers) that couples one or more of the liquid permeable layers 508 and/or 608 and/or one or more of the attractant layers 506 and/or 606 to one or more of the liquid impermeable layers 502, 602, and/or 702, one or more of the tissue sublayers 514, 614, and/or 706, and/or one or more of the pulp sublayers 512 and/or 612 (e.g., a portion of the pulp sublayers 512 and/or 612 not formed of a pulp powder).

Figure 8B:
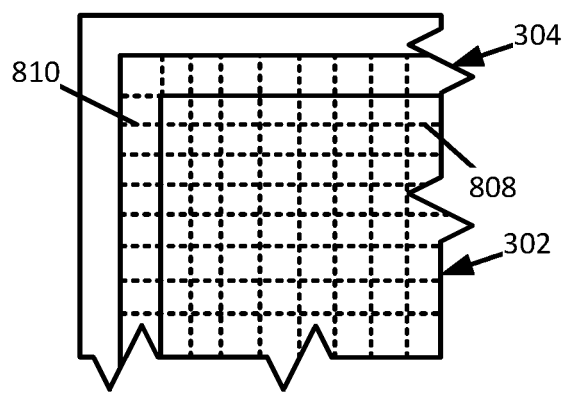
FIG. 8B is a magnified view of a portion of an absorbent pad, such as the absorbent pad of FIG. 3, having cells defined therein, consistent with embodiments of the present disclosure.

In some instances, the recessed region 302 and raised region 304 can include a plurality of cells 808 formed therein (see FIG. 8B showing a magnified example of a portion of an absorbent pad having cells formed therein). Each of the plurality of cells 808 and 810 can be configured to retain a predetermined quantity of superabsorbent polymer powder and/or pulp powder therein.

For example, cells 810 defining the raised region 304 can include more superabsorbent polymer by mass than cells 808 forming the recessed region 302. The cells 808 and 810 can generally be described as preventing powders from migrating between the recessed region 302 and the raised region 304. For example, the borders of each of the cells 808 and 810 can be sealed using an adhesive and/or heat sealing as discussed herein in relation to the sealing regions 800 and 802.

Figure 9:
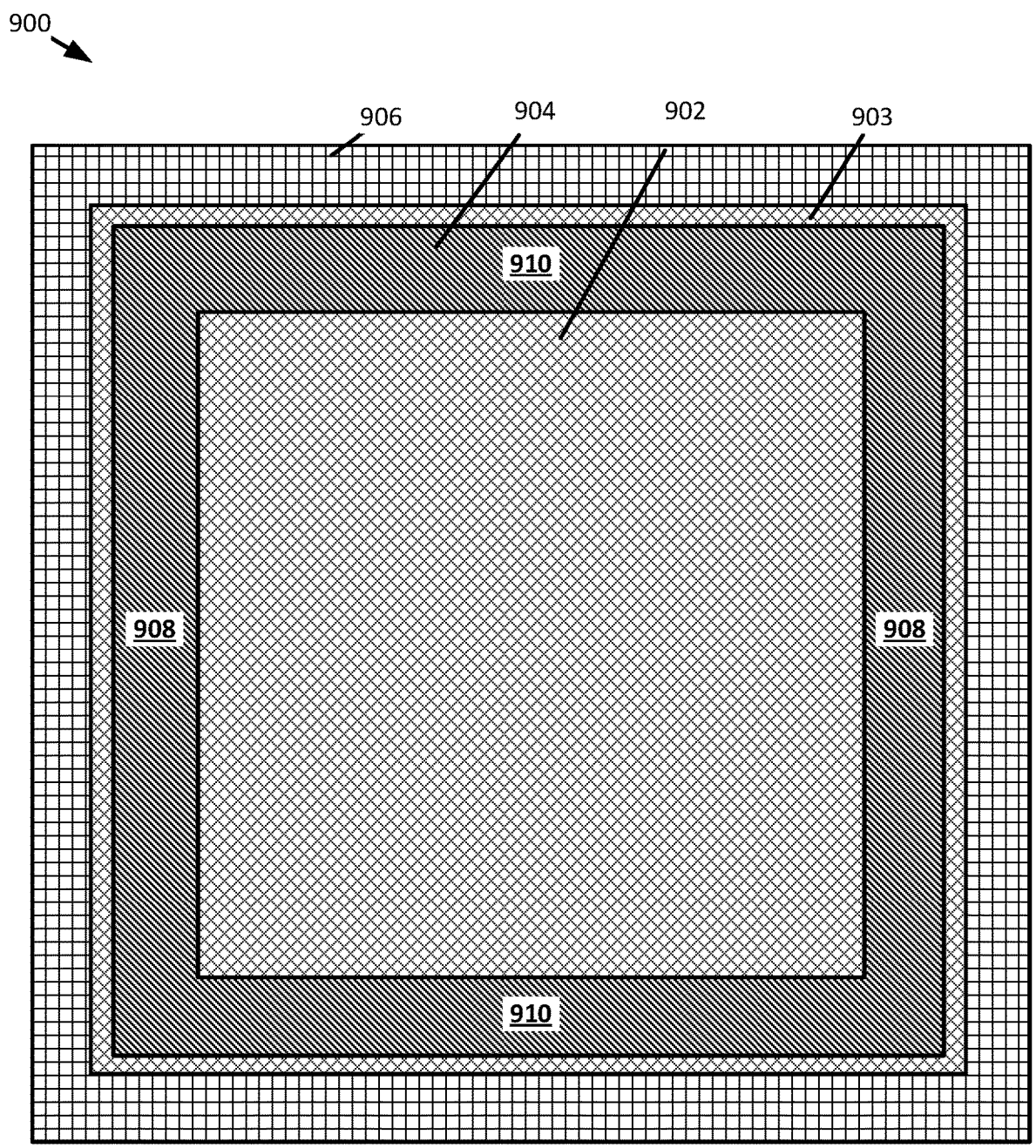
FIG. 9 is a schematic view of an example of an absorbent pad, consistent with embodiments of the present disclosure.

FIG. 9 shows a schematic example of an absorbent pad 900, which may be an example of the absorbent pad 100 of FIG. 1. As shown, the absorbent pad 900 includes a recessed region 902, a raised region 904, and a peripheral region 906. The raised region 904 extends around the recessed region 902 and the peripheral region 906 extends around the raised region 904. The raised region 904 can be configured to expand (e.g., raise) in response to liquid being absorbed therein such that the recessed region 902 is recessed relative to the raised region 904. The raised region 904 and the recessed region 902 can be configured such that liquid (e.g., unabsorbed liquid) collects within the recessed region 902. As such, the recessed region 902 and the raised region 904 can be configured to absorb at least a portion of the liquid deposited thereon.

In some instances, a step region 903 can extend around the raised region 904 such that the step region 903 is disposed between the peripheral region 906 and the raised region 904. The step region 903 can have a configuration (e.g., layers or sublayers) similar to that of the recessed region 902, the raised region 904, and/or the peripheral region 906. For example, the step region 903 may be at least partially defined by at least a portion of one or more of the recessed region 902, the raised region 904, and/or the peripheral region 906.

In some instances, a first set of opposing sides 908 of the raised region 904 can include a first quantity of superabsorbent polymer and a second set of opposing sides 910 of the raised region 904 can include a second quantity of superabsorbent polymer. For example, the first set of opposing sides 908 may each include 1 g of superabsorbent polymer and the second set of opposing sides 910 may include 1.5 g of superabsorbent polymer. In these instances, the recessed region 902 may not include superabsorbent polymer.

Figure 10:
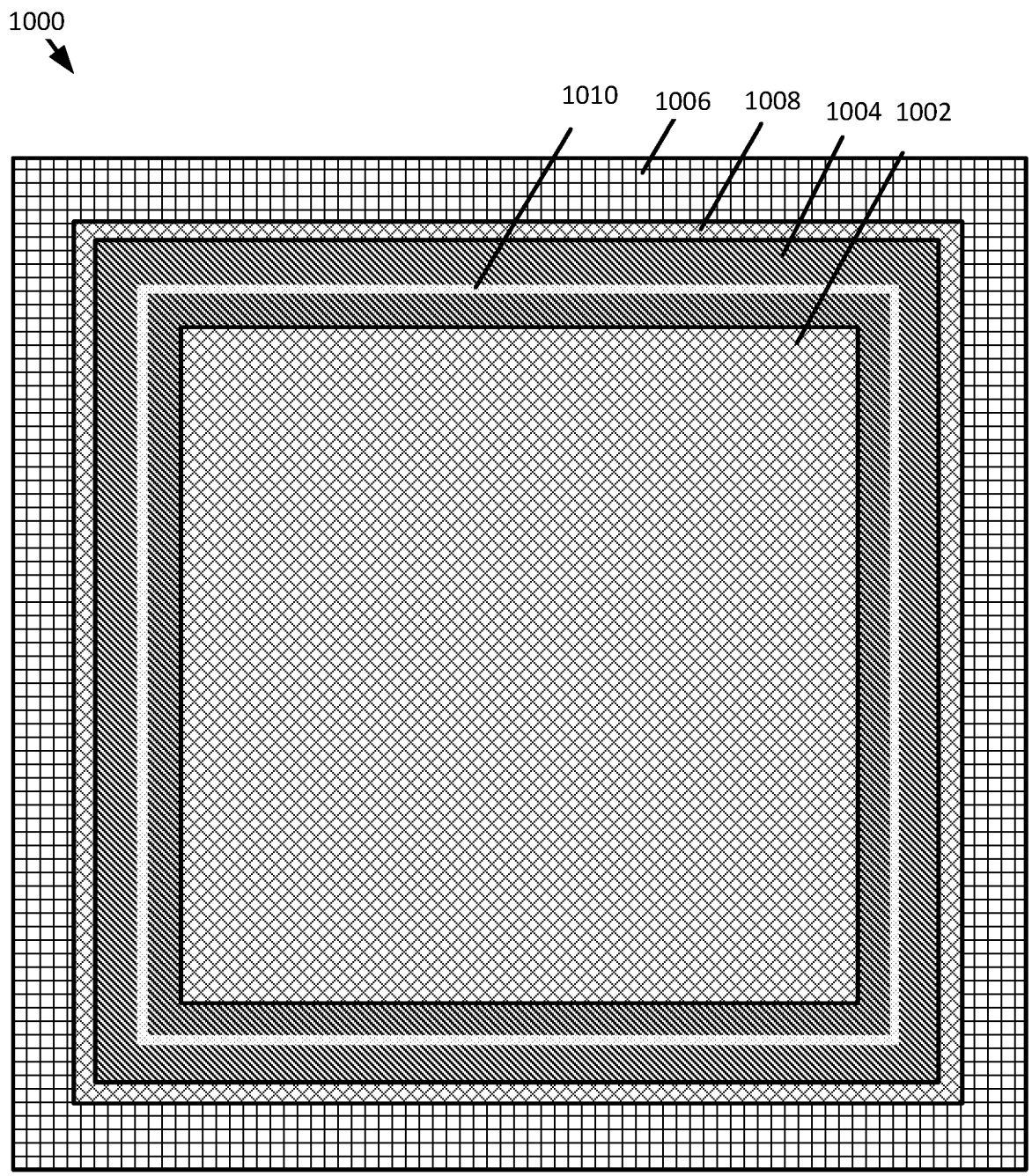
FIG. 10 is a schematic view of an example of an absorbent pad, consistent with embodiments of the present disclosure.

FIG. 10 shows a schematic example of an absorbent pad 1000, which may be an example of the absorbent pad 100 of FIG. 1. As shown, the absorbent pad 1000 includes a recessed region 1002, a raised region 1004, and a peripheral region 1006. In some instances, a step region 1008 can extend around the raised region 1004 such that the step region 1008 is disposed between the peripheral region 1006 and the raised region 1004. The step region 1008 can have a configuration (e.g., layers or sublayers) similar to that of the recessed region 1002, the raised region 1004, and/or the peripheral region 1006. For example, the step region 1008 may be at least partially defined by at least a portion of one or more of the recessed region 1002, the raised region 1004, and/or the peripheral region 1006.

The recessed region 1002 and the step region 1008 are configured to be recessed relative to the raised region 1004 in response to a liquid being at least partially absorbed by the absorbent pad 1000 (e.g., the recessed region 1002, the raised region 1004, and/or the step region 1008). In other words, the raised region 1004 is configured to expand (e.g., raise) in response to liquid being absorbed therein. As such, when a liquid is absorbed by the recessed region 1002, the step region 1008, and the raised region 1004, the recessed region 1002 and the step region 1008 can be configured to be recessed relative to the raised region 1004.

As shown, the raised region 1004 can include one or more ridges 1010 defined therein. The one or more ridges 1010 can extend from the recessed region 1002 prior to a liquid being absorbed by at least a portion of the absorbent pad 1000. As such, the one or more ridges 1010 may help retain at least a portion of a liquid incident on the absorbent pad 1000 within the recessed region 1002 and/or raised region 1004 prior to the raised region 1004 expanding in response to a liquid absorbed therein. The one or more ridges 1010 can be configured to expand with the raised region 1004 in response to the raised region 1004 absorbing a liquid incident on the absorbent pad 1000. As such, the one or more ridges 1010 may extend from the raised region 1004 after the raised region 1004 absorbs a liquid. A height of the one or more ridges 1010 prior to the absorbent pad 1000 absorbing liquid may measure in a range of 0.1 mm to 10 mm.

In some instances, the raised region 1004 can include two or more ridges 1010. For example, the ridges 1010 can be spaced apart from each other such that a channel is defined between adjacent ridges 1010. For example, a separation distance between adjacent ridges may measure in a range of 3 mm to 15 mm. The channel can be configured to retain liquid prior to being absorbed by, for example, the raised region 1004.

Figure 11:
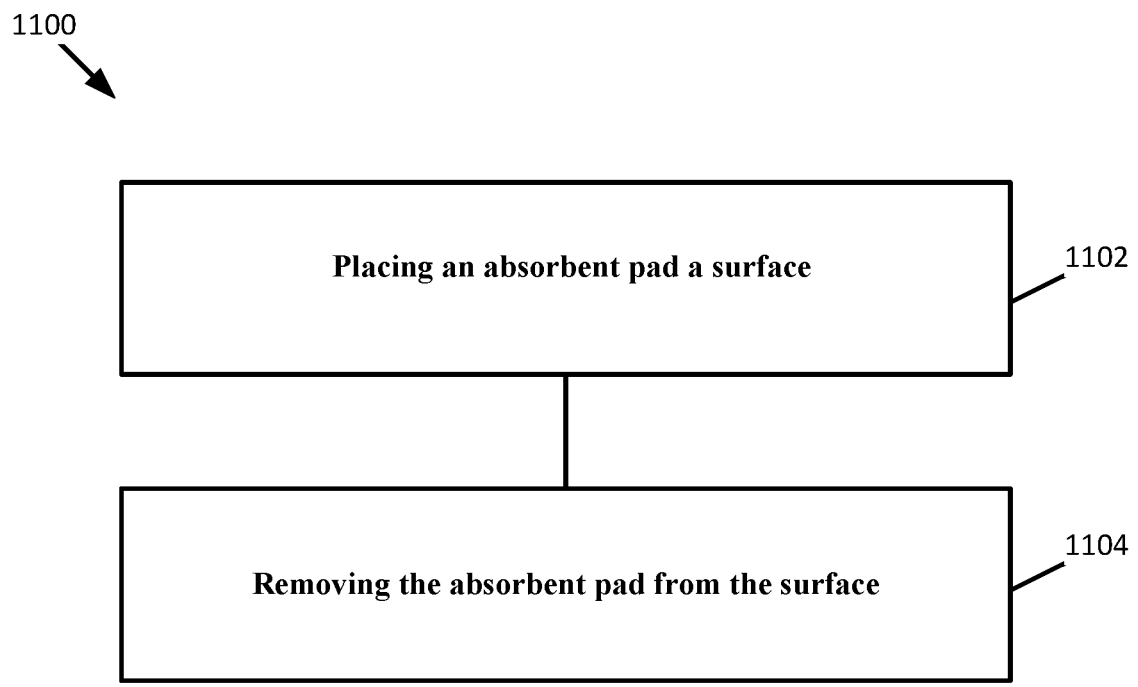
FIG. 11 shows a flow chart of an example method of using an absorbent pad, such as the absorbent pad of FIG. 1, consistent with embodiments of the present disclosure.

FIG. 11 shows an example of a preferred method 1100 of using an absorbent pad, such as the absorbent pad 100 of FIG. 1. As shown, the method 1100 includes a step 1102. The step 1102 can include placing the absorbent pad on a surface such as a floor. The absorbent pad can include a liquid permeable layer, a liquid impermeable layer, and a liquid absorbent layer disposed between the liquid permeable layer and the liquid impermeable layer. The liquid absorbent layer may include a first absorption region and a second absorption region. The second absorption region may extend around the first absorption region and may be configured to absorb more liquid per unit area than the first absorption region.

The method 1100 may include a step 1104. The step 1104 may include removing the absorbent pad from the surface after a liquid is at least partially absorbed by the absorbent pad. In some instances, it may be determined that a liquid is at partially absorbed by the absorbent pad when the second absorption region defines a raised region such that the first absorption region is recessed relative to the second absorption region.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An absorbent pad comprising:
a liquid permeable layer;
a liquid impermeable layer; and
a liquid absorbent layer disposed between the liquid permeable layer and the liquid impermeable layer, the liquid absorbent layer including
a first absorption region; and
a second absorption region, the second absorption region extending around the first absorption region, the second absorption region being configured to absorb more liquid per unit area than the first absorption region;
a superabsorbent polymer in both the first absorption region and the second absorption region, whereby the first absorption region and the second absorption region both contain the superabsorbent polymer;
wherein, when in a dry state, the first absorption region and the second absorption region are substantially coplanar;
wherein the absorbent pad functions such that, when a liquid is applied to the first absorption region and the second absorption region in the dry state, the first absorption region and the second absorption region absorb the liquid and the second absorption region expands to define a raised region and the first absorption region is recessed relative to the second absorption region; and
wherein the superabsorbent polymer in the first absorption region and the second absorption region comprises a retention absorbency in a range of 30 g/g to 45 g/g as measured in a 0.9% NaCl aqueous solution.

2. The absorbent pad of claim 1, wherein the superabsorbent polymer in the first absorption region and the second absorption region comprises:
an absorption capacity in a range of 55 g/g to 65 g/g as measured in a 0.9% NaCl aqueous solution.

3. The absorbent pad of claim 1, wherein the superabsorbent polymer in the first absorption region and the second absorption region comprises:
an absorptive rate to absorb at least one of 50, 100 or 150 milliliters of 0.9% NaCl aqueous solution in a range of 15 seconds to 40 seconds.

4. The absorbent pad of claim 1, wherein the superabsorbent polymer in the first absorption region and the second absorption region comprises:
a moisture content in a range of 4% to 9%.

5. The absorbent pad of claim 1, wherein the superabsorbent polymer in the first absorption region and the second absorption region comprises:
a bulk density in a range of 0.60 g/ml to 0.85 g/ml.

6. The absorbent pad of claim 1, wherein the superabsorbent polymer in the first absorption region and the second absorption region comprises:
particles having a particle size less than 850 microns.

7. The absorbent pad of claim 1, wherein the superabsorbent polymer in the first absorption region and the second absorption region comprises:
particles having a particle size range of 180 microns to 500 microns for between 80% and 90% of the particles.

8. An absorbent pad comprising:
a liquid permeable layer;
a liquid impermeable layer; and
a liquid absorbent layer disposed between the liquid permeable layer and the liquid impermeable layer, the liquid absorbent layer including
a first absorption region; and
a second absorption region, the second absorption region extending around the first absorption region, the second absorption region being configured to absorb more liquid per unit area than the first absorption region;
a superabsorbent polymer in both the first absorption region and the second absorption region, whereby the first absorption region and the second absorption region both contain the superabsorbent polymer;
wherein, when in a dry state, the first absorption region and the second absorption region are substantially coplanar;
wherein the absorbent pad functions such that, when a liquid is applied to the first absorption region and the second absorption region in the dry state, the first absorption region and the second absorption region absorb the liquid and the second absorption region expands to define a raised region and the first absorption region is recessed relative to the second absorption region; and
wherein the superabsorbent polymer in the first absorption region and the second absorption region comprises an absorption capacity in a range of 55 g/g to 65 g/g as measured in a 0.9% NaCl aqueous solution.

9. The absorbent pad of claim 8, wherein the superabsorbent polymer in the first absorption region and the second absorption region comprises:
an absorptive rate to absorb at least one of 50, 100 or 150 milliliters of 0.9% NaCl aqueous solution in a range of 15 seconds to 40 seconds.

10. The absorbent pad of claim 8, wherein the superabsorbent polymer in the first absorption region and the second absorption region comprises:
a moisture content in a range of 4% to 9%.

11. The absorbent pad of claim 8, wherein the superabsorbent polymer in the first absorption region and the second absorption region comprises:
a bulk density in a range of 0.60 g/ml to 0.85 g/ml.

12. The absorbent pad of claim 8, wherein the superabsorbent polymer in the first absorption region and the second absorption region comprises:
particles having a particle size less than 850 microns.

13. The absorbent pad of claim 8, wherein the superabsorbent polymer in the first absorption region and the second absorption region comprises:
particles having a particle size range of 180 microns to 500 microns for between 80% and 90% of the particles.

14. An absorbent pad comprising:
a liquid permeable layer;
a liquid impermeable layer; and
a liquid absorbent layer disposed between the liquid permeable layer and the liquid impermeable layer, the liquid absorbent layer including
a first absorption region; and
a second absorption region, the second absorption region extending around the first absorption region, the second absorption region being configured to absorb more liquid per unit area than the first absorption region;
a superabsorbent polymer in both the first absorption region and the second absorption region, whereby the first absorption region and the second absorption region both contain the superabsorbent polymer;
wherein, when in a dry state, the first absorption region and the second absorption region are substantially coplanar;
wherein the absorbent pad functions such that, when a liquid is applied to the first absorption region and the second absorption region in the dry state, the first absorption region and the second absorption region absorb the liquid and the second absorption region expands to define a raised region and the first absorption region is recessed relative to the second absorption region; and
wherein the superabsorbent polymer in the first absorption region and the second absorption region comprises an absorptive rate to absorb at least one of 50, 100 or 150 milliliters of 0.9% NaCl aqueous solution in a range of 15 seconds to 40 seconds.

15. The absorbent pad of claim 14, wherein the superabsorbent polymer in the first absorption region and the second absorption region comprises:
a moisture content in a range of 4% to 9%.

16. The absorbent pad of claim 14, wherein the superabsorbent polymer in the first absorption region and the second absorption region comprises:
a bulk density in a range of 0.60 g/ml to 0.85 g/ml.

17. The absorbent pad of claim 14, wherein the superabsorbent polymer in the first absorption region and the second absorption region comprises:
particles having a particle size less than 850 microns.

18. The absorbent pad of claim 14, wherein the superabsorbent polymer in the first absorption region and the second absorption region comprises:
particles having a particle size range of 180 microns to 500 microns for between 80% and 90% of the particles.

19. An absorbent pad comprising:
a liquid permeable layer;
a liquid impermeable layer; and
a liquid absorbent layer disposed between the liquid permeable layer and the liquid impermeable layer, the liquid absorbent layer including
a first absorption region; and
a second absorption region, the second absorption region extending around the first absorption region, the second absorption region being configured to absorb more liquid per unit area than the first absorption region;
a superabsorbent polymer in both the first absorption region and the second absorption region, whereby the first absorption region and the second absorption region both contain the superabsorbent polymer;
wherein, when in a dry state, the first absorption region and the second absorption region are substantially coplanar;
wherein the absorbent pad functions such that, when a liquid is applied to the first absorption region and the second absorption region in the dry state, the first absorption region and the second absorption region absorb the liquid and the second absorption region expands to define a raised region and the first absorption region is recessed relative to the second absorption region; and
wherein the superabsorbent polymer in the first absorption region and the second absorption region comprises a moisture content in a range of 4% to 9%.

20. The absorbent pad of claim 19, wherein the superabsorbent polymer in the first absorption region and the second absorption region comprises:
a bulk density in a range of 0.60 g/ml to 0.85 g/ml.

21. The absorbent pad of claim 19, wherein the superabsorbent polymer in the first absorption region and the second absorption region comprises:
particles having a particle size less than 850 microns.

22. The absorbent pad of claim 19, wherein the superabsorbent polymer in the first absorption region and the second absorption region comprises:
particles having a particle size range of 180 microns to 500 microns for between 80% and 90% of the particles.

23. An absorbent pad comprising:
a liquid permeable layer;
a liquid impermeable layer; and
a liquid absorbent layer disposed between the liquid permeable layer and the liquid impermeable layer, the liquid absorbent layer including
a first absorption region; and
a second absorption region, the second absorption region extending around the first absorption region, the second absorption region being configured to absorb more liquid per unit area than the first absorption region;
a superabsorbent polymer in both the first absorption region and the second absorption region, whereby the first absorption region and the second absorption region both contain the superabsorbent polymer;
wherein, when in a dry state, the first absorption region and the second absorption region are substantially coplanar;
wherein the absorbent pad functions such that, when a liquid is applied to the first absorption region and the second absorption region in the dry state, the first absorption region and the second absorption region absorb the liquid and the second absorption region expands to define a raised region and the first absorption region is recessed relative to the second absorption region; and wherein the superabsorbent polymer in the first absorption region and the second absorption region comprises a bulk density in a range of 0.60 g/ml to 0.85 g/ml.

24. The absorbent pad of claim 23, wherein the superabsorbent polymer in the first absorption region and the second absorption region comprises:
particles having a particle size less than 850 microns.

25. The absorbent pad of claim 23, wherein the superabsorbent polymer in the first absorption region and the second absorption region comprises:
particles having a particle size range of 180 microns to 500 microns for between 80% and 90% of the particles.

26. An absorbent pad comprising:
a liquid permeable layer;
a liquid impermeable layer; and
a liquid absorbent layer disposed between the liquid permeable layer and the liquid impermeable layer, the liquid absorbent layer including
a first absorption region; and
a second absorption region, the second absorption region extending around the first absorption region, the second absorption region being configured to absorb more liquid per unit area than the first absorption region;
a superabsorbent polymer in both the first absorption region and the second absorption region, whereby the first absorption region and the second absorption region both contain the superabsorbent polymer;
wherein, when in a dry state, the first absorption region and the second absorption region are substantially coplanar;
wherein the absorbent pad functions such that, when a liquid is applied to the first absorption region and the second absorption region in the dry state, the first absorption region and the second absorption region absorb the liquid and the second absorption region expands to define a raised region and the first absorption region is recessed relative to the second absorption region; and
wherein the superabsorbent polymer in the first absorption region and the second absorption region comprises particles having a particle size less than 850 microns.

27. The absorbent pad of claim 26, wherein the superabsorbent polymer in the first absorption region and the second absorption region comprises:
particles having a particle size range of 180 microns to 500 microns for between 80% and 90% of the particles.

28. An absorbent pad comprising:
a liquid permeable layer;
a liquid impermeable layer; and
a liquid absorbent layer disposed between the liquid permeable layer and the liquid impermeable layer, the liquid absorbent layer including
a first absorption region; and
a second absorption region, the second absorption region extending around the first absorption region, the second absorption region being configured to absorb more liquid per unit area than the first absorption region;
a superabsorbent polymer in both the first absorption region and the second absorption region, whereby the first absorption region and the second absorption region both contain the superabsorbent polymer;
wherein, when in a dry state, the first absorption region and the second absorption region are substantially coplanar;
wherein the absorbent pad functions such that, when a liquid is applied to the first absorption region and the second absorption region in the dry state, the first absorption region and the second absorption region absorb the liquid and the second absorption region expands to define a raised region and the first absorption region is recessed relative to the second absorption region; and
wherein the superabsorbent polymer in the first absorption region and the second absorption region comprises particles having a particle size range of 180 microns to 500 microns for between 80% and 90% of the particles.

* * * * *